United States Patent
Jeon et al.

(10) Patent No.: US 10,893,194 B2
(45) Date of Patent: Jan. 12, 2021

(54) DISPLAY APPARATUS AND CONTROL METHOD THEREOF

(71) Applicant: SAMSUNG ELECTRONICS CO., LTD., Suwon-si (KR)

(72) Inventors: Han-byoul Jeon, Yongin-si (KR); Dae-wang Kim, Suwon-si (KR); Jeong-hun Park, Seongnam-si (KR); Han-sub Park, Anyang-si (KR); Jong-hee Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 15/819,455

(22) Filed: Nov. 21, 2017

(65) Prior Publication Data

US 2018/0146138 A1 May 24, 2018

(30) Foreign Application Priority Data

Nov. 21, 2016 (KR) .......................... 10-2016-0155256

(51) Int. Cl.
*H04N 5/232* (2006.01)
*G06T 3/40* (2006.01)
(Continued)

(52) U.S. Cl.
CPC ....... *H04N 5/23238* (2013.01); *G06T 3/4038* (2013.01); *H04N 21/47* (2013.01);
(Continued)

(58) Field of Classification Search
CPC ................................................ H04N 55/23238
(Continued)

(56) References Cited

U.S. PATENT DOCUMENTS

2008/0048848 A1 2/2008 Kawakami
2010/0002071 A1 1/2010 Ahiska
(Continued)

FOREIGN PATENT DOCUMENTS

CN 102737097 A 10/2012
CN 103930817 A 7/2014
(Continued)

OTHER PUBLICATIONS

International Search Report and Written Opinion (PCT/ISA/210 & PCT/ISA/237) dated Mar. 12, 2018 issued by the International Searching Authority in counterpart International Patent Application No. PCT/KR2017/012939.
(Continued)

*Primary Examiner* — Amir Shahnami
(74) *Attorney, Agent, or Firm* — Sughrue Mion, PLLC

(57) ABSTRACT

A display apparatus includes a receiver, an image processor, a display and a controller. The receiver receives an image of content in the form image segments. The image processor processes the image of content received via the receiver. The display displays the processed image of content. The controller controls the image processor to display an image corresponding to one viewpoint of the image of content, and display information about a display quality of at least one image segment based on reception states of the image segments. With this, the display apparatus may provide the information about display quality for the at least one segment of the image of content, thereby allowing a user to watch the image of content while smoothly moving a viewpoint.

26 Claims, 14 Drawing Sheets

(51) Int. Cl.
  *H04N 21/47*   (2011.01)
  *H04N 21/485*  (2011.01)
  *H04N 21/488*  (2011.01)

(52) U.S. Cl.
  CPC ........ *G06T 2200/24* (2013.01); *H04N 21/485* (2013.01); *H04N 21/4888* (2013.01)

(58) Field of Classification Search
  USPC ........................................................ 348/39
  See application file for complete search history.

(56) References Cited

U.S. PATENT DOCUMENTS

| | | | |
|---|---|---|---|
| 2011/0102423 | A1 | 5/2011 | Nam et al. |
| 2012/0139947 | A1 | 6/2012 | Kishima et al. |
| 2013/0322845 | A1 | 12/2013 | Suzuki et al. |
| 2014/0211319 | A1* | 7/2014 | Park ........................ G02B 27/01 359/630 |
| 2015/0317832 | A1* | 11/2015 | Ebstyne .................. G06F 3/011 345/633 |
| 2016/0142612 | A1 | 5/2016 | Bray et al. |
| 2016/0170481 | A1 | 6/2016 | Fateh |
| 2016/0277772 | A1* | 9/2016 | Campbell ........ H04N 21/21805 |

FOREIGN PATENT DOCUMENTS

| | | |
|---|---|---|
| CN | 104079919 A | 10/2014 |
| EP | 2 824 885 A1 | 1/2015 |
| KR | 10-2010-0008044 A | 1/2010 |
| KR | 10-2012-0080504 A | 7/2012 |
| KR | 10-2014-0043344 A | 4/2014 |
| KR | 10-2016-0071797 A | 6/2016 |
| WO | 2012177378 A2 | 12/2012 |
| WO | 2015184416 A1 | 12/2015 |
| WO | 2016/123721 A1 | 8/2016 |
| WO | 2017/202700 A1 | 11/2017 |

OTHER PUBLICATIONS

Communication dated Nov. 7, 2019, issued by the European Patent Office in counterpart European Application No. 17872804.4.
Communication dated Jun. 30, 2020, issued by the Japanese Patent Office in Japanese Application No. 2019-526500.
Communication dated Oct. 30, 2020, from the State Intellectual Property Office of People's Republic of China in Chinese Application No. 201780071610.2.
Communication dated Nov. 20, 2020, issued by the European Patent Office in European Patent Application No. 17 872 804.4.

* cited by examiner

DISPLAY APPARATUS AND CONTROL METHOD THEREOF

CROSS-REFERENCE TO RELATED APPLICATION

This application claims the benefit of Korean Patent Application No. 10-2016-0155256, filed on Nov. 21, 2016 in the Korean Intellectual Property Office, the disclosure of which is incorporated herein in its entirety by reference.

BACKGROUND

Field

Apparatuses and methods consistent with exemplary embodiments relate to a display apparatus and a control method thereof, and more particularly to a display apparatus, which provides an image of content that a user can watch while smoothly moving his viewpoint, and a control method thereof.

Description of Related Art

A display apparatus may provide various images of contents. A 360 degree image is an image implemented by a technology, which captures a panoramic image with several cameras or with a camera having a plurality of lenses mounted thereon and which maps the captured panoramic image onto a virtual space. The virtual space is displayed on a screen to provide the user with a sense as if he is in a real space and thus enable the user interact with and sense the screen. To provide the 360 degree image, the display apparatus provides converts the image being displayed according to a viewpoint selected by the user, converting a spherical image into a planar image, or zooming in or out of the image being displayed.

If the image of content is a 360 degree image, since its data is larger in size than a typical image, the display apparatus may be configured to receive only those segments of the image, which are being watched or expected to be watched by the user, rather than receiving all segments of the image at once. Also, if the display apparatus uses adaptive streaming, which automatically perceives a network environment to adaptively change resolution of image and transmit the changed-resolution image, the 360 degree image may have different resolutions for different segments thereof received at different times.

Thus, for to the related art display apparatus as described above, there is a problem in that if a viewer changes a viewpoint while watching the 360 degree image, she or he may be prevented from smoothly watching the 360 degree image due to unexpected buffering or lowered resolution.

SUMMARY

One or more exemplary embodiments may address at least the above problems and/or disadvantages and other disadvantages not described above. Also, the exemplary embodiments are not required to overcome the disadvantages described above, and may not overcome any of the problems described above.

One or more exemplary embodiments may provide a display apparatus, which provide information about display quality for at least one segment of an image of content according to a reception state of segments of the image of content, thereby, if the image of content is a 360 degree image, allowing a user to smoothly move a viewpoint while watching the image, and a control method thereof.

According to an aspect of an exemplary embodiment, there is provided a display apparatus including: a receiver configured to receive a plurality of image segments; an image processor configured to process the image segments received via the receiver; a display configured to display the processed image segments; and a controller configured to generate a content image mapped to three dimensional (3D) object based on the plurality of image segments received via the receiver, control the image processor to display an image corresponding to a first viewpoint of the generated content image, and control the image processor to display information about a display quality of an image of at least one adjacent viewpoint adjacent to the image of the first viewpoint being currently displayed, based on reception states of the image segments. Accordingly, the user may smoothly move the viewpoint while watching the image of content.

The display quality may include at least one of a speed in which an image segment corresponding to the at least one adjacent viewpoint is received, an extent to which the image segment of the at least one adjacent viewpoint is received, a playable time of the image segment of the at least one adjacent viewpoint, and a resolution of the image segment of the at least one adjacent viewpoint. Thus, the display apparatus may provide various types of information about the display quality for the user.

The controller may be configured to display a degree of the display quality as text. Thus, the information about display quality may be precisely conveyed.

The controller may be configured to display on the display, a user interface (UI) including at least one graphic having a size corresponding to a degree of the display quality. Thus, the information about display quality may be provided via an intuitive interface, thereby improving the apparatus's usability.

The controller may be configured to display on the display, a first color in response to the display quality being a first level, and a second color, different from the first color, in response to the display quality being a second level higher than the first level. Thus, the user may intuitively know the degree of the display quality according to the colors.

The controller may be configured to display a third color between the first color and the second color on the display in response to the display quality being a third level between the first level and the second level. Thus, a color corresponding to an intermediate level of display quality may be introduced.

The controller may be configured to display on the display, an arrow indicating a direction of at least one image segment having a degree of display quality higher than that of other image segments or indicating a direction of at least one image segment having a degree of display quality lower than that of other image segments. Thus, the user may be provided with a guide to a direction in which to move the viewpoint for smoothly watching the image of content.

The controller may be configured to display the information about display quality on an edge of the display corresponding to a direction of the least one adjacent viewpoint, for example, the direction of at least one image segment. Thus, various exemplary embodiments, which provide the information about display quality, may be introduced.

The controller may be configured to display the information about the display quality on the display in response to the first viewpoint being moved after having been stopped.

Thus, various exemplary embodiments are provided for a point in time at which to provide the information about the display quality.

The controller may be configured to display the information about the display quality on the display in response to the first viewpoint being moved and coming within a predetermined distance from a border between the image segments. Thus, various exemplary embodiments for the point of time at which to provide the information about display quality may be introduced.

The controller may be configured to display the information about display quality on the display in response to a degree of the display quality being lower than a predetermined critical level. Thus, various exemplary embodiments for the point of time at which to provide the information about display quality may be introduced.

The controller may be configured to display the information about display quality on the display in response to the display quality being changing more than a predetermined amount. Thus, various exemplary embodiments for the point of time at which to provide the information about display quality may be introduced.

According to an aspect of another exemplary embodiment, there is provided a control method of a display apparatus including: receiving a plurality of image segments; processing the received image segments; and displaying the processed image segments, wherein the displaying comprises generating a content image mapped to three dimensional (3D) object based on the plurality of received image segments, displaying an image corresponding to a first viewpoint from among the generated content image, and displaying information about a display quality for an image of at least one adjacent viewpoint adjacent to the image of the first viewpoint being currently displayed, based on reception states of the image segments. Accordingly, the user may smoothly move the viewpoint while watching the image of content.

The display quality may include at least one of a speed at which an image segment corresponding to the at least one adjacent viewpoint has been received, an extent to which the image segment of the at least one adjacent viewpoint has been received, a playable time of the image segment of the at least one adjacent viewpoint, and a resolution of the image segment of the at least one adjacent viewpoint. Thus, the display apparatus may provide various information about display quality for the user.

The displaying the information about the display quality may include displaying a degree of the display quality as text. Thus, the information about display quality may be precisely conveyed.

The displaying the information about the display quality may include displaying on the display, a user interface (UI) including at least one graphic having a size corresponding to a degree of the display quality. Thus, the information about display quality may be provided via an intuitive interface, thereby improving the apparatus's usability.

The displaying information about the display quality may include displaying a first color in response to the display quality being a first level, and displaying a second color in response to the display quality being a second level higher than the first level. Thus, the user may intuitively know the degree of display quality according to the colors.

The displaying information about display quality may include displaying a third color between the first color and the second color in response to the display quality being a third level between the first level and the second level. Thus, a color corresponding to an intermediate degree of display quality may be introduced.

The displaying information about the display quality may include displaying an arrow indicating a direction of at least one image segment having a degree of display quality higher than that of other image segments or indicating a direction of at least one image segment having a degree of display quality lower than that of other image segments. Thus, the user may be provided with a guide to a direction in which to move the viewpoint for smoothly watching the image of content.

The displaying information about display quality may include displaying the information about the display quality on an edge of the display corresponding to a direction of the least one adjacent viewpoint, for example, the direction of at least one image segment. Thus, various exemplary embodiments, which provide the information about display quality, may be introduced.

BRIEF DESCRIPTION OF THE DRAWINGS

The above and other exemplary aspects, features, and advantages of exemplary embodiments of the present disclosure will be more apparent from the following description taken in conjunction with the accompanying drawings, in which.

DETAILED DESCRIPTION OF EXEMPLARY EMBODIMENTS

Figure 1:
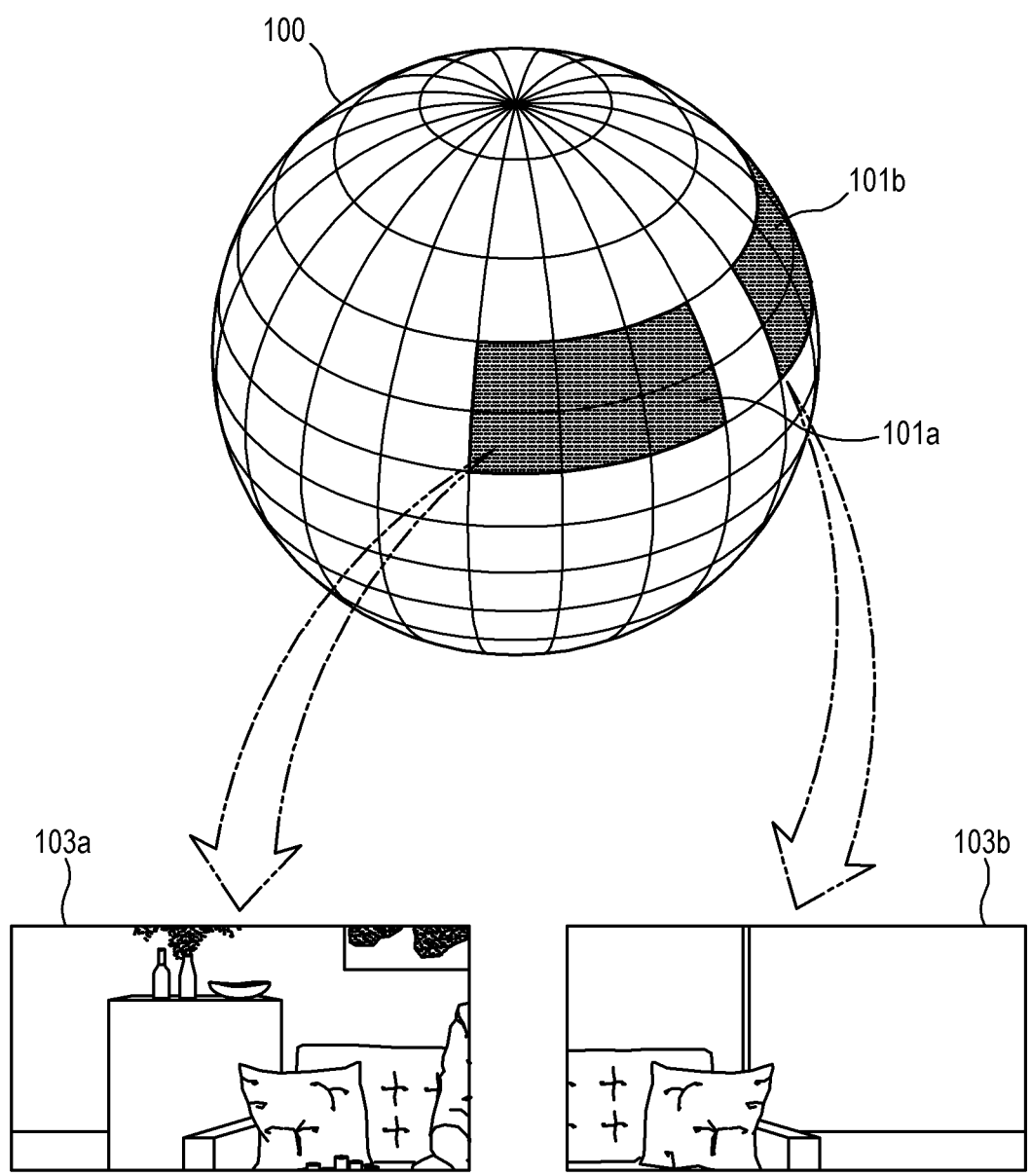
FIG. 1 illustrates a display apparatus according to an exemplary embodiment.

Hereinafter, exemplary embodiments will be described in detail with reference to accompanying drawings. Matters shown in the accompanying drawings are referred to in the following descriptions of the exemplary embodiments and for clarity, like reference numerals or symbols presented in respective drawings denote like elements, which substantially perform the same functions.

In the following description, if terminologies, each of which includes such an ordinal number as 'first', 'second' and the like, are used, those terminologies are used (unless expressly specified otherwise) merely to describe various elements. The terminologies are only used for the purpose of discriminating one element from other elements. In doing so, the various elements should not be limited by the corresponding terminologies, respectively. The terminologies used in the following description of various exemplary embodiments are applied for purposes of explanation only and not for the purpose of limiting the exemplary embodiments as defined by the appended claims and their equivalents.

The present disclosure described below with reference to the exemplary embodiments may be applied to a display apparatus, which provides a image of content to enable a viewer's viewpoint to be changed through 360 degrees.

FIG. 1 illustrates a display apparatus according to an exemplary embodiment. The display apparatus 1 according to an exemplary embodiment may be implemented as a television (TV). In other exemplary embodiments, the display apparatus 1 may be implemented as any apparatus capable of outputting an image, including, but not limited to a smart phone, a tablet personal computer (PC), a mobile phone, a computer, a multimedia reproducing device, an electronic picture frame, a digital advertising board, a large format display (LFD), digital signage, a set-top box, a wearable device such as a smart watch or a head-mounted display (HMD), a smart refrigerator, etc.

Figure 2:
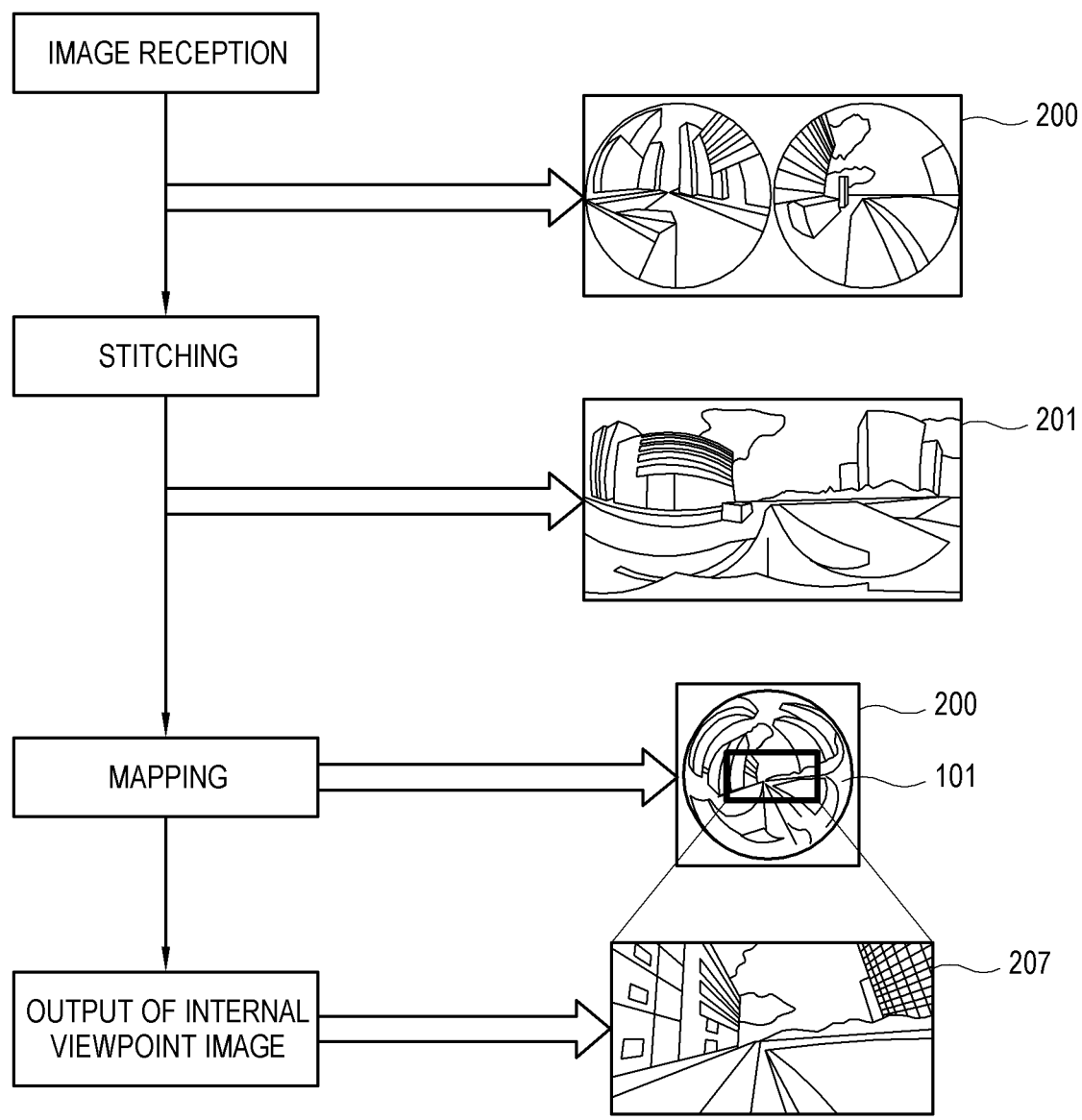
FIG. 2 illustrates a process of processing a 360 degree image according to an exemplary embodiment.
Figure 3:
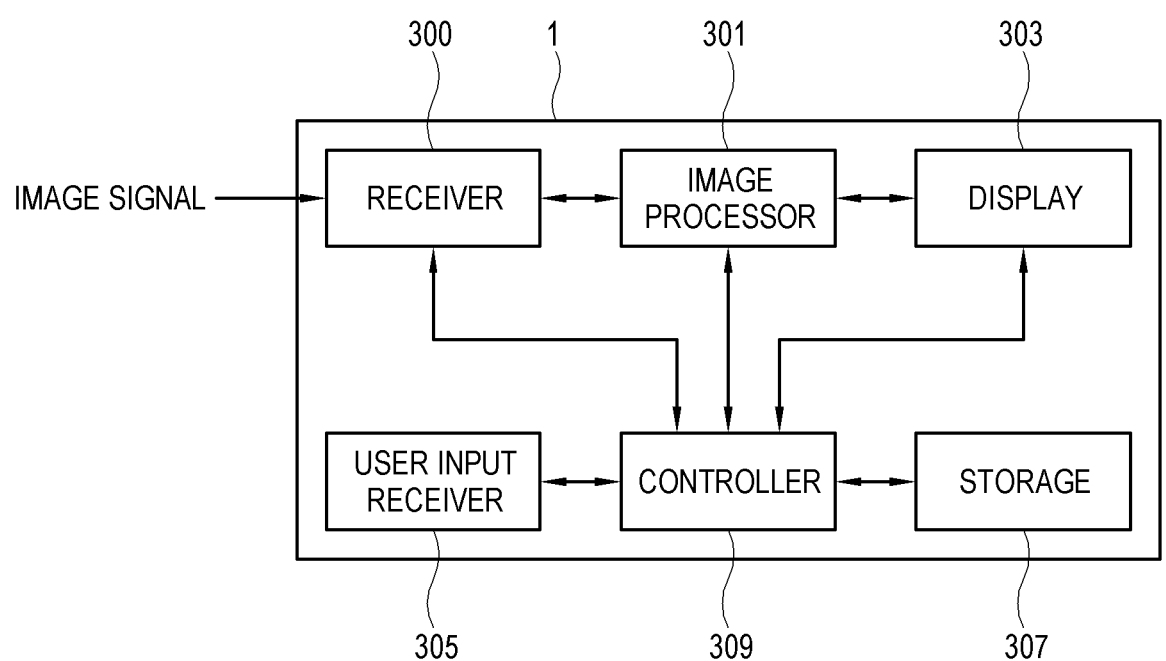
FIG. 3 illustrates a block diagram of the display apparatus according to an exemplary embodiment

In this exemplary embodiment, the display apparatus 1, also shown in FIG. 3, may be implemented as an apparatus which can process a plurality of image segments to output a image of content. The image of content may be a 360 degree image having a plurality of viewpoints. Hereinafter, the image of content may be a 360 degree image. In this exemplary embodiment, if the image of content is the 360 degree image, the display apparatus 1 may generate an image 100 that is mapped to the 3D mapping object. If the 3D mapping object is spherical, the mapped image 100 may also be referred to as a "spherical image." The display apparatus 1 processes one region corresponding to a viewpoint 101a or 101b from the spherical image 100 to obtain an output image 103a or 103b, and displays the obtained output image 103a or 103b on a screen. In the exemplary embodiment, the spherical image 100 may be an image generated by mapping to the 3D mapping object, a plurality of images, each of which is obtained with respect to different bearings by a camera having at least one lens mounted thereon. In some cases, the at least one lens may be a wide angle lens. In this exemplary embodiment, the 3D mapping object is spherical, but it is not limited thereto. Also, the means for generating the spherical image 100 is not limited to the specifically-explained illustrations. For example, the spherical image 100 may be an image generated by a plurality of cameras. The display apparatus 1 may receive the spherical image 100 from at least one camera or from an external apparatus, such as a server, a universal serial bus (USB) storage device, a computer, etc. In another exemplary embodiment, the display apparatus 1 may include at least one camera. The display apparatus 1 may receive, from an external device, a plurality of images, the spherical image 100, and a stitched image (201 in FIG. 2) in which a plurality of images are summed and stitched prior to being mapped in the spherical shape. The received images may be received as a single image, and according to implementations, by segments. Each of the segments includes an image of a region corresponding thereto. Hereinafter, the image of the region corresponding to each segment is also referred to an image segment. If an image is received by segments, the display apparatus 1 may process and provide the received image by segments. If one viewpoint 101 is located in a region of a not yet received segment, [is 101 a region or a viewpoint??]the display apparatus 1 does not smoothly provide an output image 103a or 103b corresponding to the one viewpoint 101. Also, if the one viewpoint 101 is located in a region of a segment having a low resolution, the resolution of the output image 103a or 103b corresponding to the one viewpoint 101 becomes different from that of the image being watched.

FIG. 2 illustrates a process of processing an image of content according to an exemplary embodiment. If the image of content is a content image having a 360 degree viewpoint, an input image 200 includes a plurality of images, each of which is obtained with respect to different bearings by at least one camera or by a camera having at least one lens. At least one image processing is performed with respect to the input image 200 to generate an output image 207. The at least one image processing may be performed at the display apparatus 1, but may also, or alternately, be performed externally, so that processed image is transmitted to the display apparatus 1. As described later, the processed image may be transmitted as a single image, and according to implementations, by segments (reference numerals 400-405 in FIG. 4). The at least one image processing includes stitching processing, mapping processing, and projection processing.

The display apparatus 1 maps the input image 200 to a 3D mapping object to generate a spherical image 100. The 3D mapping object is not limited to a spherical shape and may include a hexahedron cube or the like. Hereinafter, an exemplary embodiment of mapping the input image in the spherical shape will be explained. However, this explanation is not intended to exclude other types of mapping processings from the present disclosure. The display apparatus 1 then generates a planar image by performing projection processing, which converts a curved image of a region, corresponding to one viewpoint 101 from the mapped and generated spherical image 100, into the planar image, and outputs the generated planar image as the output image 207.

In another exemplary embodiment, if the input image 200 is received by segments 400 to 405, the display apparatus 1 may, after additionally performing stitching processing on the input image 200 according to implementations, map the input image 200 to generate the spherical image 100.

The stitching processing is a process which connects (or stitches) the input image 200 according to the 3D mapping object by using a high dynamic range imaging (HDRI) map method or a cube map method to generate a stitched image 201. If the stitching processing is performed by the HDRI map method, the input image 200 is mapped to an equirectangular image as an operation before being mapped to a spherical shape. If the stitching processing is performed by the cube map method, six directionally-obtained images are mapped to a cube which is a regular hexahedron. The spherical mapping processing maps the generated stitched image 201 to the spherical shape to generate the spherical image 100.

As another exemplary embodiment, the output image 207 may be generated from one region of the stitched image 201 corresponding to the viewpoint 101 without going through an operation of generating the spherical image 100.

The selection of the one region corresponding to the viewpoint 101 according to an exemplary embodiment may be determined by a user. To be more specific, according to a user input of moving the viewpoint 101 while the screen is displayed, the display apparatus 1 determines a region corresponding to the moved viewpoint 101 from among the spherical image 203 and displays a picture or image of the determined one region corresponding to the viewpoint 101. A user command of moving the viewpoint 101 (hereinafter, also referred as a "viewpoint moving command") may be received via a remote controller. The display apparatus 1 may receive the viewpoint moving command using any of various input means, which, according to implemented methods, include a touch of finger, a movement of HMD, and the like, for example.

The content image according to an exemplary embodiment is transmitted by segments (400 to 405 in FIG. 4), as described above. The display apparatus 1 receives the content image by segments 400 to 405 and displays an image corresponding to one viewpoint 101 from among the received content image. The display apparatus 1 may generate a spherical image 100 by stitching an input image 200 received by segments 400 to 405 and/or mapping it to a 3D mapping object. Alternatively, the display apparatus 1 may generate the spherical image 100 by receiving a stitched image 201 divided into segments 400 to 405 and mapping it to the 3D mapping object, and may display an image corresponding to one viewpoint 101 from the generated spherical image 100. As another exemplary embodiment, the display apparatus 1 may receive a spherical image 100 divided into segments 400 to 405 and display an image corresponding to one viewpoint 101 from the received spherical image 100. Since the reception state of each of the segments 400 to 405 may be different, all of the frames of the content image may not always have the form of finished stitched image 201 or a finished spherical image 100.

The display apparatus 1 further displays information about the display quality of an image of at least one viewpoint adjacent to the image of the one viewpoint 101 being currently displayed, based on the reception states of the respective segments 400 to 405.

The display quality may indicate a degree to which a user can keep smoothly watching the image when the viewpoint is changed. Thus, the display quality may include includes speeds at which segments, corresponding to viewpoints adjacent to the one viewpoint 101 corresponding to the output image 207 being currently displayed ("adjacent segments"), are received. The display quality may also include amounts by which the adjacent segments are received, times at which the adjacent segments can be played, resolutions of the adjacent, and the like, but is not limited thereto. The moving direction of the viewpoint 101 is not limited. The display apparatus 1 may move the viewpoint 101 left and right/up and down/diagonally, or forward and backward. The movement of the viewpoint 101 may include zooming in and out of the screen. As above, the display apparatus 1 provides the information about display quality for the image of the at least one adjacent viewpoint movable from the output image 207 of the viewpoint 101 being currently displayed, thereby allowing the user to move the viewpoint 101 based on the provided information and thus to smoothly use contents without stopping or the contents being unavailable.

Also, the image of content may be a moving image. In this case, the image of content may be processed by frames and the display apparatus 1 may receive the image of content in units of frames. The segments 400 to 405 are thus obtained by dividing one frame into a plurality of regions, and if the image of content includes the 360 degree image, the display apparatus 1 receives each frame according to the segments 400 to 405.

If the user moves the viewpoint 101 into at least one segment 400 to 405 for which an image has not been received or for which an image of only low resolution has been is received, the unexpected buffering or low resolution may prevent the user from watching the image of content or may make the viewing undesirable. The display apparatus 1 provides the information about display quality for the image of at least one adjacent viewpoint adjacent to the output image 207 of the one viewpoint 101 being currently displayed (an "adjacent image"). For example, the information about the display quality for the adjacent image may include speeds at which adjacent segments are received, amounts by which the adjacent segments are received, times at which the adjacent segments are playable, resolutions of the adjacent segments, and the like.

FIG. 3 illustrates a block diagram of a display apparatus according to an exemplary embodiment. The display apparatus 1 according to an exemplary embodiment includes a receiver 300, an image processor 301, a display 303, and a controller 309. The display apparatus 1 according to an exemplary embodiment may further include at least one of a user input receiver 305 and a storage 307. The configuration of the display apparatus 1 according to an exemplary embodiment, as illustrated in FIG. 3 is merely an example and may be implemented in configurations other than that illustrated in FIG. 3. In other words, the display apparatus according to an exemplary embodiment may be implemented as including additional elements other than those illustrated in FIG. 3 or by removing any one from among the elements illustrated in FIG. 3.

The receiver 300 receives an image signal including an input image 200. The receiver 300 may be provided with a tuner for receiving the image signal. The tuner may tune to a broadcast signal of any one selected by the user from among a plurality of channels. The receiver 300 may receive the image signal by segments 400 to 405 from a server via an internet. As an example, the receiver 300 includes a communicator for communicating with an external apparatus.

The communicator may include a connector for wired communication. The connector may transmit and receive signals/data according to standards, such as a high definition multimedia interface (HDMI), a HDMI-consumer electronics control (HDMI-CEC), a USB, a component and so on, and may include at least one connecting part or terminal corresponding to the respective standards. The communicator may perform wired communication with a plurality of servers via a wired local area network (LAN).

The communicator may be implemented in any of many other communication ways beside the connector including the connecting part or the terminal for wired communication. For example, the communicator may include a radio frequency (RF) circuit for transmitting and receiving a RF signal to communicate wirelessly with the external apparatus, and may be configured to communicate using one or more protocols, such as wireless fidelity (Wi-Fi), Bluetooth (BT), Zigbee, ultra-wide band (UWM), wireless USB, and near field communication (NFC).

The user input receiver 305 receives a user input to transmit to the controller 309. The user input receiver 305 may be implemented as any of various types of input according to the method of the input. The user input receiver 305 may be implemented as, for example, a menu button installed on an outer side the display apparatus 1, a remote control signal receiver to receive a remote control signal corresponding to the user input from a remote controller, a touch screen provided on the display 303 to receive a touch input of user, a camera to sense a gesture input of user, a microphone to recognize a voice input of user, a sensor to sense a movement of user, or the like. The user input includes a viewpoint moving command. Based on the viewpoint moving command, the display apparatus 1 changes a region corresponding to the viewpoint 101 and displays on the display 303, an output image 203 corresponding to the changed region from the spherical image 100.

The storage 307 is configured to store various data of the display apparatus 1. The storage 307 may be provided with a non-volatile memory, such as a flash memory, an erasable programmable read only memory (EPROM), an electrically erasable and programmable read only memory (EEPROM) or the like, The storage may further include a volatile memory, such as a dynamic random access memory (DRAM) or a static random access memory (SRAM), having faster read or write speed than the non-volatile memory.

The image processor 301 performs image processing with respect to the image signal of the input image 200 received via the receiver 300 and outputs the processed image signal to the display 303 to display the output image 203. Under the control of the controller 309, the image processor 301 may perform the image processing with respect to a region corresponding to one viewpoint 101, from the input image 200, to generate the output image 203. Also, if the viewpoint 101 is moved, the image processor 301 generates an output image 203 of a region corresponding to the moved viewpoint 101. The image processor 301 may be implemented as one or more hardware and/or software modules or a combination thereof. The viewpoint 101 is determined according to a user input, as described above.

As another exemplary embodiment, the viewpoint 101 may be determined based on information about display quality for the segments 400 to 405. For example, when the viewpoint 101 is moved to a region corresponding to a one or more segments for which a degree of the display quality is less than a predetermined level according a viewpoint moving command of the user, the display apparatus 1 may not further move the viewpoint 101 in spite of the viewpoint moving command of the user. At this time, the display apparatus 1 may instead, transmit a request to an external server, which is transmitting the image by segments, to preferentially transmit the one or more segments of the region to which the user is trying to move the viewpoint, thereby preparing for additional viewpoint moving commands of the user.

The display 303 displays the output image 203. Implemented types of the display 303 are not limited, and the display 303 may be implemented by any of various types of display, such as a liquid crystal display (LCD), a plasma display panel (PDP), a light emitting diode (LED) display, an organic light emitting diode (OLED) display, a surface-conduction electron-emitter, a carbon nano-tube, a nano-crystal display, etc.

If the display 303 is an LCD, the display 303 includes an LCD panel, a backlight unit to supply light to the LCD panel, a panel driving board to drive the LCD panel, and so on. The display 303 may be also implemented as an OLED panel, which is a spontaneous emission panel, without the backlight unit.

The controller 309 performs control needed for operating all the elements of the display apparatus 1. The controller 309 may include a control program for controlling to perform the control operation as described above, a non-volatile memory in which the control program is installed, a volatile memory in which at least one control program is loaded, and at least one microprocessor or central processing unit (CPU) for executing the loaded control program. The control program may include at least one program which is implemented in the form of at least one of a Basic Input/Output System (BIOS), a device driver, an operating system, a firmware, a platform, and an application program (application). As an exemplary embodiment, the application program may be installed or stored in advance in the display apparatus 1 during manufacturing, or installed in the display apparatus 1 based on data received form an external source while in use. The data of the application program may be downloaded to the display apparatus 1 from an external server, such as, for example, an application market or the like.

As an exemplary embodiment, the controller 309 controls the image processor 301 to change a resolution of an output image being displayed based on information about the display quality for segments 400 to 405 within which one viewpoint 101 is located. For example, if the viewpoint 101 is located in a first segment 404 having a resolution of 720 pixels, and the viewpoint is then moved to a second segment 401 having a resolution of 480 pixels, such that a portion of a region corresponding to the viewpoint 101 includes the first segment 404 and another portion of the region includes the second segment 401, the controller 309 may control the image processor 301 to allow the output image 203 to have the lower resolution of 480 pixels, to provide consistency.

Figure 4:
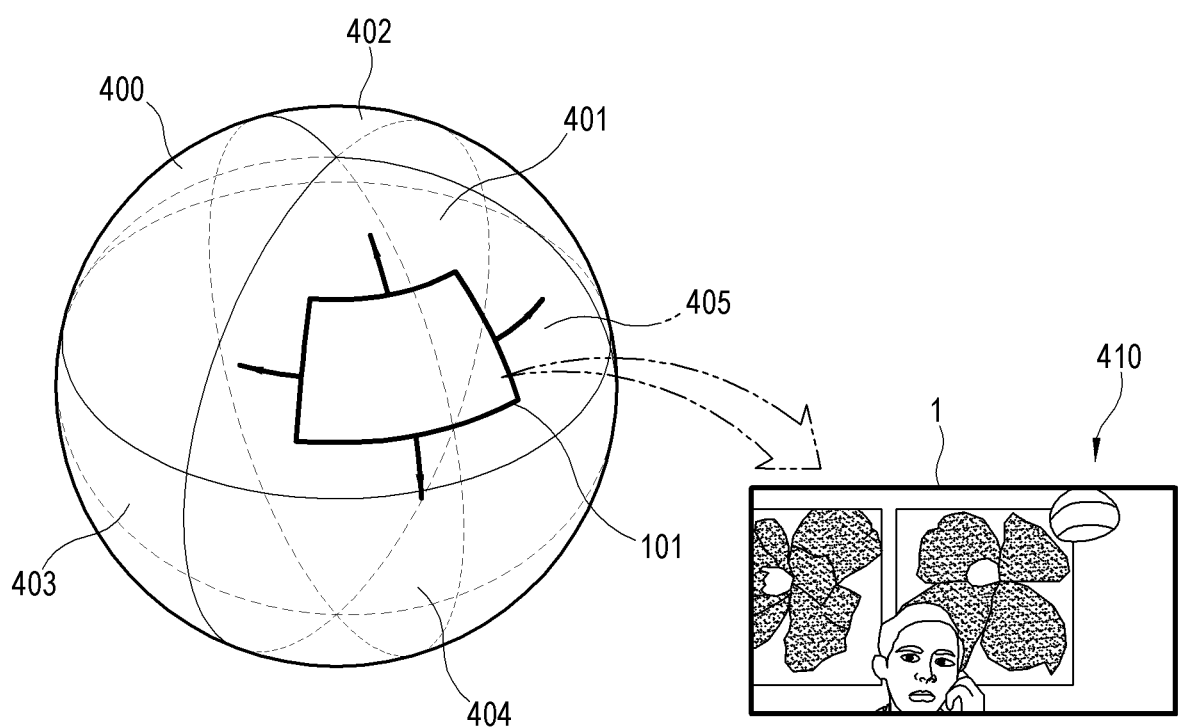
FIG. 4 illustrates an image of content divided in a plurality of segments according to an exemplary embodiment.

FIG. 4 illustrates an image of content divided in a plurality of segments 400 to 405 according to an exemplary embodiment. As an exemplary embodiment, the controller 309 displays an image 410 of one viewpoint 101 from the image of content received by segments 400 to 405 and displays information about the display quality of adjacent images, based on reception states of the respective segments 400 to 405. For example, the controller 309 may display information about display quality for segments 400, 402, 403, 404 and 405 different from a segment 401 in which the current viewpoint 101 is located. As described above, the image of content is received by segments 400 to 405 as the input image 300, the stitched image 201, or as the spherical image 100, via the receiver 300. In the drawing, for the sake of convenient illustration, the plurality of segments 400 to 405 of the spherical image 100 are illustrated as being received, but the image receiving method of the present disclosure is not limited thereto. As described above, the display apparatus 1 may generate the spherical image 100 by receiving the stitched image 201 by segments 400 to 405 and mapping it to the 3D mapping object. Also, regions corresponding to the plurality of segments 400 to 405 in the spherical image 100 are limited to illustrations in the drawing.

If the image of content is a 360 degree image, data thereof is fairly large. However. An amount of data that can be processed per unit time by the receiver 300 is limited. To optimize a user's viewing, the controller 309 may request a server to transmit a segment 401 corresponding to a region (screen) being watched by the user or segments 400, 402 and 404 of viewpoints adjacent to the current viewpoint 101 in preference to other segments 403 and 405. The server transmits the image of content by segments 400 to 405 taking into account the request of the display apparatus 1, the data processing speed of the display apparatus 1 and the like. At this time, the segments 400 and 402 having a lower order of priority may be transmitted in a low resolution depending on the network state. The order of priority of the segments 400 to 405 may be determined by various conditions, including an analysis for implementation aspects of other users, the intention of producer of cinematographic work, a network state, a position of current viewpoint 101, among others.

Hereinafter, various exemplary embodiments of providing information about display quality will be described with reference to the accompanying drawings. The information about display quality may be provided in many ways, which include displaying a user interface (UI) including at least one item corresponding to a degree of display quality for at least one of the segments 400 to 405, displaying a text indicating the degree of display quality, displaying at least a portion of the screen to have a size or color corresponding to the degree of display quality on and so on. Hereinbelow, for the sake of convenient illustration, some exemplary embodiments from among various exemplary embodiments will be described, but the present disclosure is not limited thereto.

Figure 5:
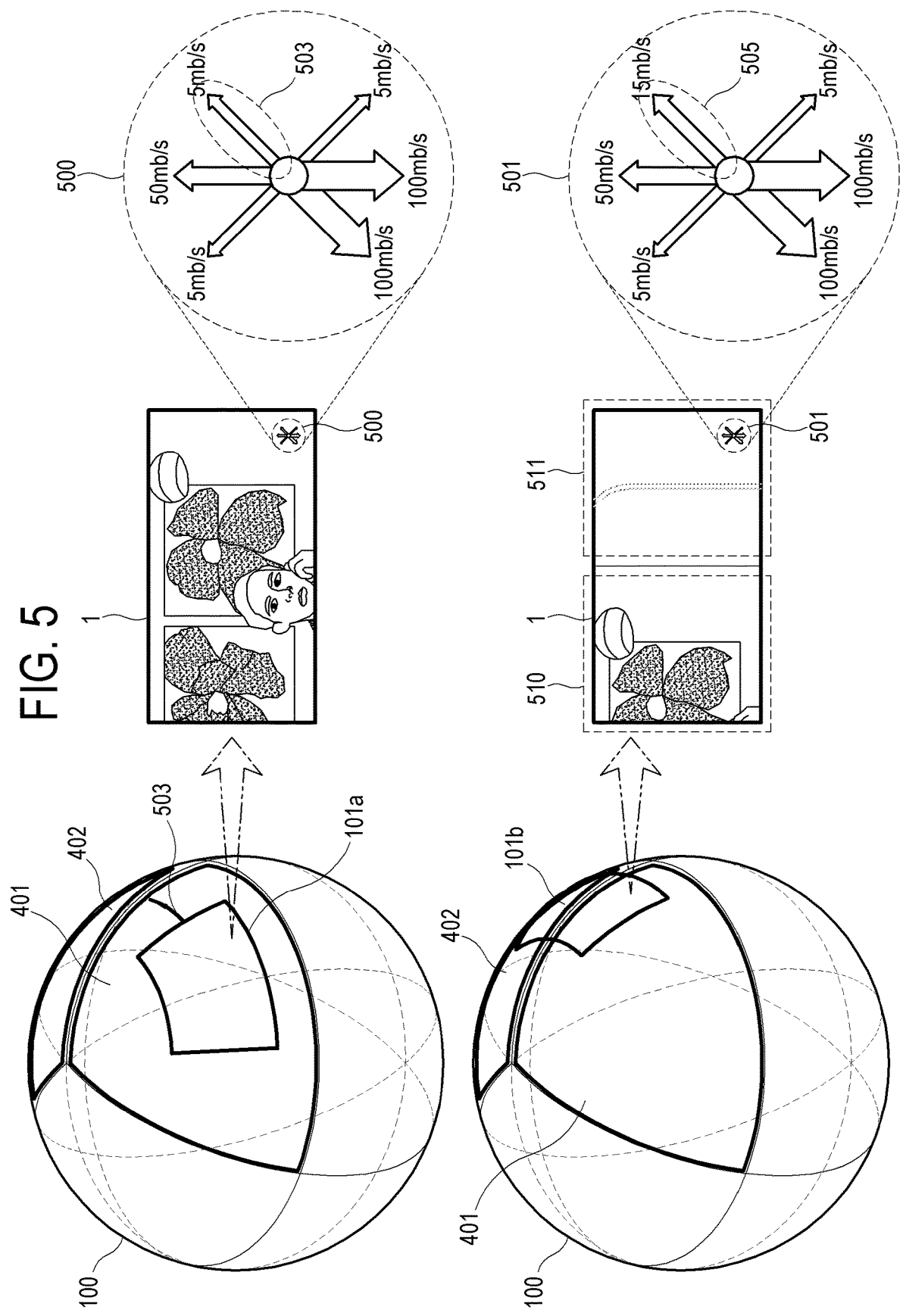
FIG. 5 illustrates an example of providing a user interface (UI) including at least one item having a size corresponding to a degree of display quality according to an exemplary embodiment.

FIG. 5 illustrates an example of providing a UI 500 including at least one item having a size corresponding to a level of display quality according to an exemplary embodiment. The controller 309 according to an exemplary embodiment may display the UI 500 on the display 303. The UI 500 includes a plurality of items having sizes corresponding to levels of display quality, respectively. The UI 500 includes a plurality of arrows indicating adjacent viewpoints, respectively. The arrows may point to the corresponding adjacent viewpoint. Although in the drawing, speeds in which segments 400 to 405, corresponding to the adjacent viewpoints, are received have been displayed, the present disclosure is not limited thereto. The size of each arrow may correspond to a level of the display quality for the corresponding adjacent viewpoint. For example, if a speed in which the a segment is received is 100 mb/s, a corresponding arrow has a large size, if the speed is 50 mb/s, a corresponding arrow has an intermediate size, and if the speed is 5 mb/s, a corresponding arrow has a small size. Displaying the speeds of the segments 400 to 405, corresponding to the adjacent viewpoints, are received and the sizes of the arrows for the adjacent viewpoints as described above are merely illustrations and the present disclosure is not limited thereto.

If a viewpoint moving command for moving a viewpoint 101 in a direction 503 toward a segment 402 having receiving speed of 5 mb/s is received from the user, thus causing the controller to move the viewpoint 101 to be located at a border between two segments 401 and 402, a first portion, corresponding to a first segment 401 is smoothly displayed, but a second portion, corresponding to the second segment 402 is incompletely received, so that an output image is not displayed well.

As the second portion from among the image corresponding to the moved viewpoint 101*b* is located within the second segment 402, an order of priority of the second segment 402 gets higher. The display apparatus 1 requests an external server to preferentially transmit the second segment 402 based on the order of priority of the second segment 402. According to the request of the display apparatus 1, the speed at which the second segment 402 is downloaded is made faster. As the speed at which the second segment 402 is downloaded is changed, the display apparatus 1 provides a UI 501 in which the size and/or the text of an item, i.e., the arrow 506 of the adjacent viewpoint corresponding to a direction indicating the second segment 402, are changed. The drawings of FIG. 5 are merely provided by way of examples, and shapes and sizes of the segments 401 and 402 are not limited to those illustrated in the drawings.

Figure 6:
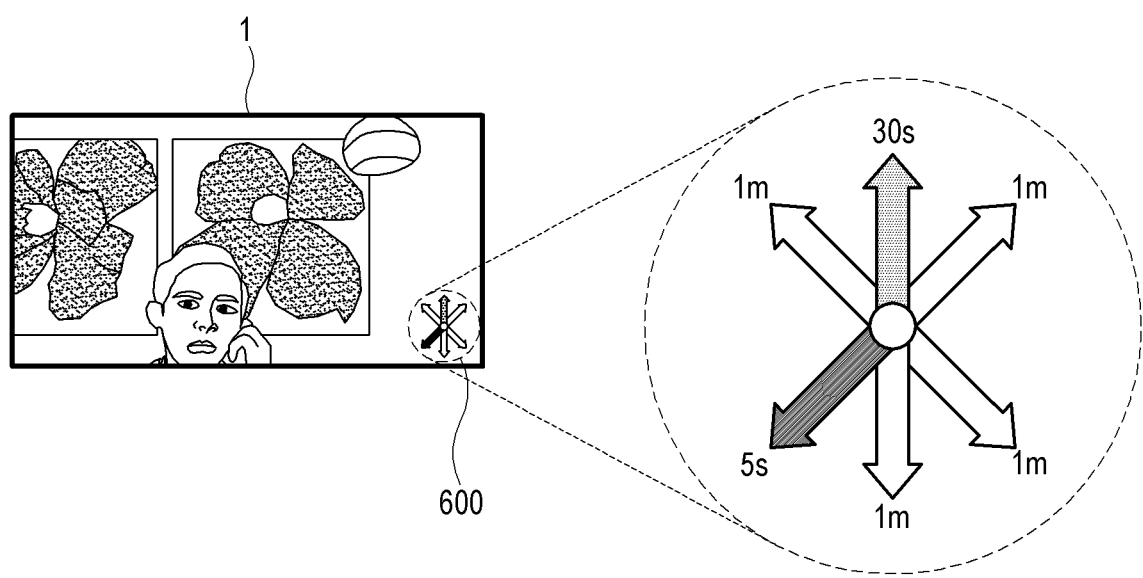
FIG. 6 illustrates another example of providing a UI including at least one items having a color corresponding to the degree of display quality according to an exemplary embodiment.

FIG. 6 illustrates another example of providing a UI 600 including at least one item having a color or shading that corresponds to the level of display quality according to an exemplary embodiment. Although in the drawing, playable times of segments 400 to 405 indicated by arrows are displayed, the present disclosure is not limited thereto. The UI 600 may include a plurality of arrows, each having a color or shade corresponding to a display quality. As an example, the controller 309 may display in a first color or shade, an arrow indicating an adjacent viewpoint located in an adjacent segment for which the display quality is a first level and may display, in a second color or shade, an arrow indicating an adjacent viewpoint located in an adjacent segment for which the display quality is a second level different from (i.e., higher or lower than) the first level. The controller 309 may display in a third color or shade, having a tone or shade between the first color or shade and the second color or shade, an arrow indicating an adjacent viewpoint located in an adjacent segment for which the display quality is a third level, between the first level and the second level. The third color or shade may include a color having a predetermined difference in color from a first color and a second color. The predetermined difference in color may be determined based on how much the third level is different from the first and the second levels. For example, if the first level is 1 minute, the first color may be a white of R: 255, G: 255 and B: 255, and the second level is 1 second, and the second color may be a black of R: 0, G: 0 and B: 0, the third color may be a grey of R: 122.5, G: 122.5 and B: 122.5 having the same difference in color from the first and the second colors when the third level is 30 seconds. In the drawing, for the sake of convenient illustration, there is illustrated only an example in which arrows corresponding to different display qualities have different contrasts, but the present disclosure is not limited thereto.

The colors of the arrows may be determined and stored corresponding to display qualities in advance. Alternatively, the colors of the arrows may be graded from one color to other color according to levels of display quality after two colors corresponding to the highest degree and the lowest degree of display quality, respectively, are determined.

According to another exemplary embodiment, an arrow indicating an adjacent segment in which an adjacent viewpoint is located may have more than two colors according to the distance between a current viewpoint 101 and the adjacent segment. For example, if the current viewpoint 101 is located in a first segment 404 and is a given distance away from a second, adjacent, segment 401 of the adjacent viewpoint, the controller 309 may display a portion of the arrow indicating the second adjacent segment 401 in a first color corresponding to the display quality of the first segment 404 and display the remainder of the arrow in a second color corresponding to the display quality of the second segment 401. In this case, the border between the first color and the second color may be divided and displayed to correspond to the given distance or may be displayed so that it is naturally gradated between the first color and the second color.

Figure 7:
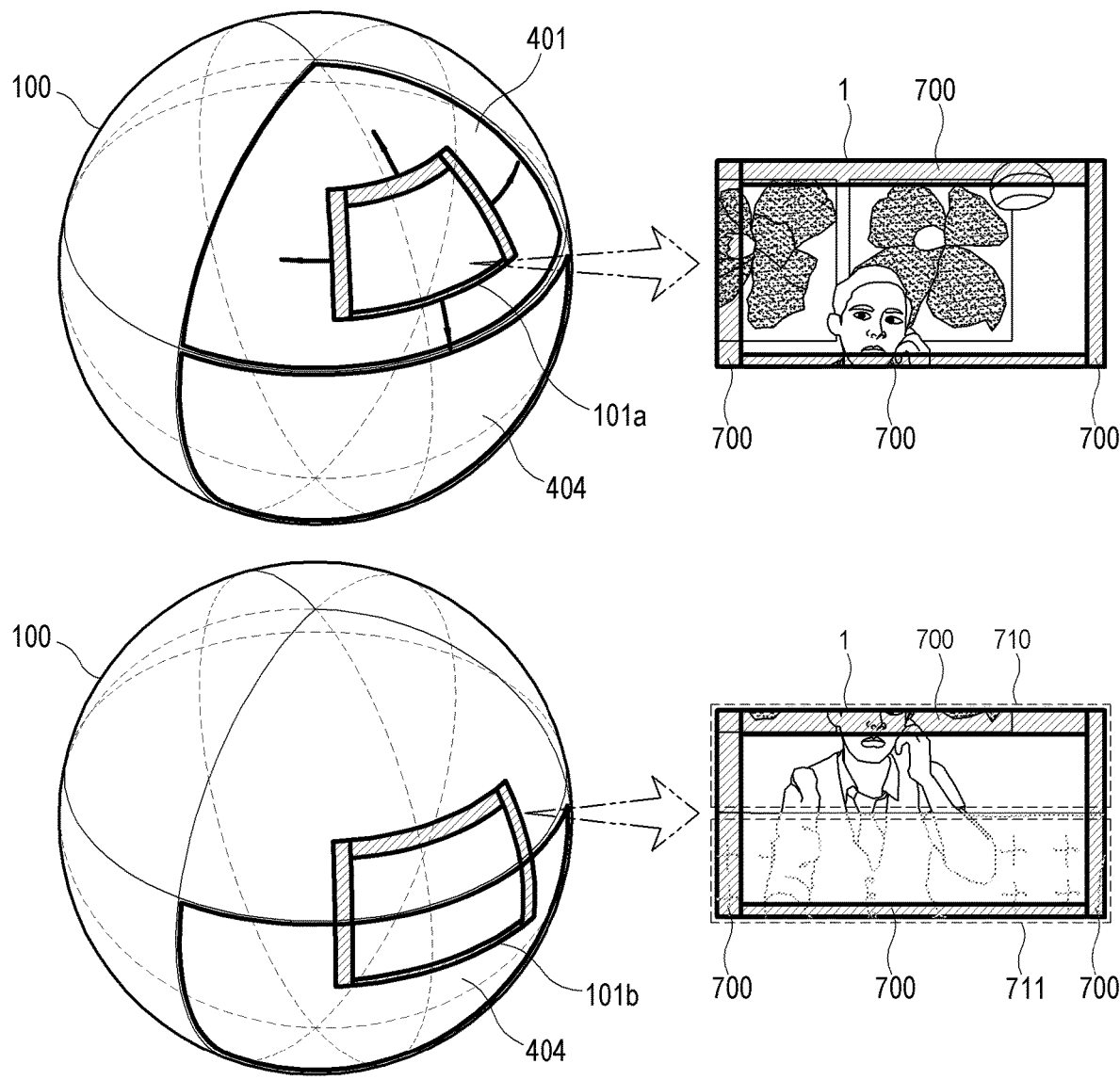
FIG. 7 illustrates an example of providing information about display quality on edges corresponding to directions toward segments of adjacent viewpoints from among an image being displayed, to have sizes corresponding to the degrees of display quality according to another exemplary embodiment.

FIG. 7 illustrates an example of providing information about display quality on edges of a display corresponding to directions toward adjacent viewpoints. According to this exemplary embodiment, the shading of each of the edges is made to have a size corresponding to the degree of the display quality of the corresponding adjacent viewpoint. The controller 309 may provide the information about the display quality as this shading of the edges corresponding to the directions toward adjacent viewpoints. As an example, the controller 309 may display shadings 700, having thicknesses corresponding to the degrees of the display qualities of the adjacent segments 400 to 405. The thicknesses of the shadings 700 may correspond to resolutions of the corresponding segments 400 to 405 in which the adjacent viewpoints are located. For example, the higher the resolution of the segment in which the corresponding adjacent viewpoint is located, the thicker the shading 700 is made to be. Also, the lower the resolution of the corresponding segment, the thinner the shading 700 is. The resolutions of the segments 400 to 405 and the thicknesses of the shadings 700 as described above are merely illustrations and the present disclosure is not limited thereto.

If a viewpoint moving command is received from a user, and the command is for moving the viewpoint 101a in a direction toward a segment of an adjacent viewpoint, the controller 308 moves the viewpoint 101a. The moved viewpoint 101b is located at a border between two segments 401 and 404.

A first portion 710 corresponding to a first segment 401 from an image corresponding to the moved viewpoint 101b is displayed in a high resolution. However, a second portion 711 corresponding to a second segment 404 from the image is displayed in a resolution lower than that of the first segment 401. As the moved viewpoint 101b is located in the second segment 404, the order of priority of the second segment 404 gets higher.

The display apparatus 1 requests that an external server preferentially transmit the second segment 404 based on the order of priority. The external server preferentially transmits the second segment 404 based on the request, thereby allowing the second segment 404 to be maintained in the high resolution. According to another exemplary embodiment, the display apparatus 1 requests that the external server transmit a second segment 404 having a high quality of image based on the order of priority.

The drawings are merely exemplary, and shapes and sizes of the segments 401 and 404 are not limited to those illustrated in the drawings.

Figure 8:
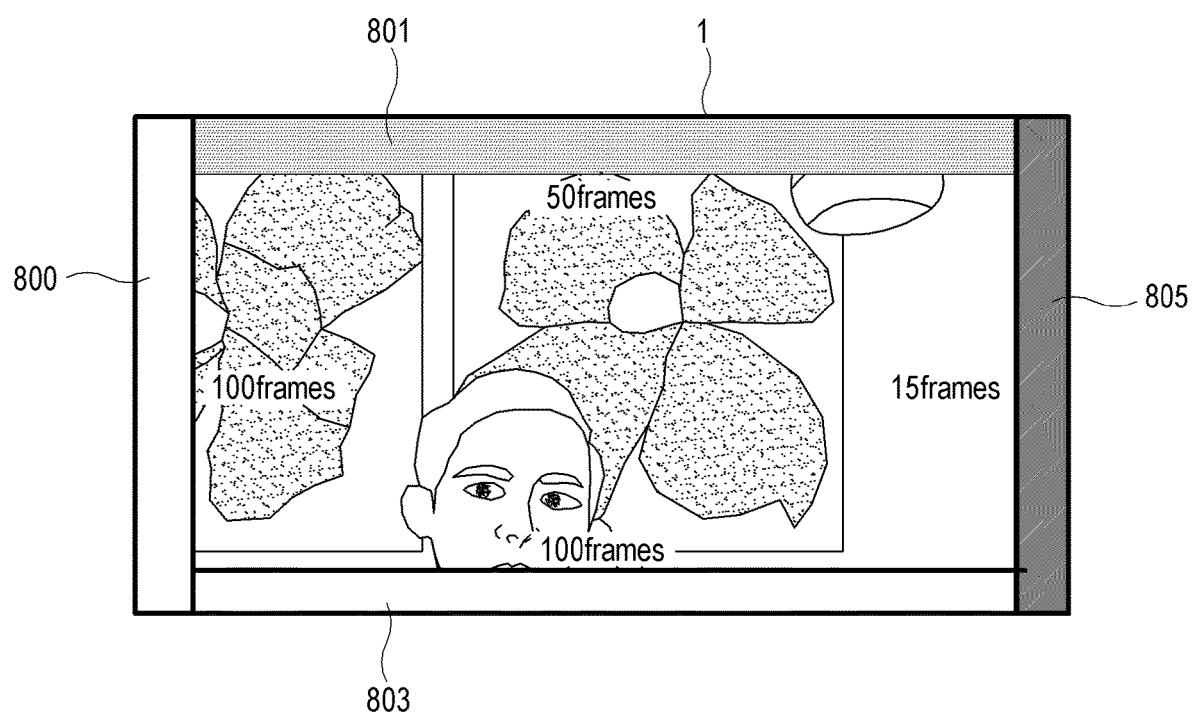
FIG. 8 illustrates another example of providing information about display quality on edges corresponding to directions toward segments of adjacent viewpoints from among an image being displayed, to have colors corresponding to the degrees of display quality according to another exemplary embodiment.

FIG. 8 illustrates another example of providing the information about display quality on edges of the display corresponding to directions toward adjacent viewpoints. According to this exemplary embodiment, the edges are made to have colors or shades corresponding to degrees of display quality for adjacent segments 400 to 405 in which adjacent viewpoints are located. Although in the drawing, the information about the display quality shown on the edges is the number of remaining frames the adjacent segments 400 to 405, the present disclosure is not limited thereto. The controller 309 may display shadings 800 to 805 having colors or shades corresponding to degrees of display quality for adjacent segments 400 to 405 of adjacent viewpoints corresponding to directions toward edges of image being displayed, respectively. As an example, the controller 309 may control to display in a first color or shade, shadings 800 and 803 of directions indicating adjacent viewpoints located in adjacent segments for which the display quality is a first level and may display, in a second color or shade, a shading 805 of direction indicating an adjacent viewpoint located in an adjacent segment for which the display quality is a second level. Also, the controller 309 may control to display in a third color or shade between the first color or shade and the second color or shade, a shading 801 of direction indicating an adjacent viewpoint located in an adjacent segment for which the display quality is a third level between the first level and the second level. For example, referring to FIG. 8, the colors of shadings 800 and 803 corresponding to segments in which the number of remaining frames is 100 is white, a color of a shading 801 corresponding to a segment in which the number of remaining frames is 50 is gray, and a color of a shading 805 corresponding to a segment in which the number of remaining frames is 15 is black. For the sake of convenient illustration, the drawing is illustrated so that shadings 800 to 805 corresponding to different display qualities have different levels of contrast, but the present disclosure is not limited thereto.

Figure 9:
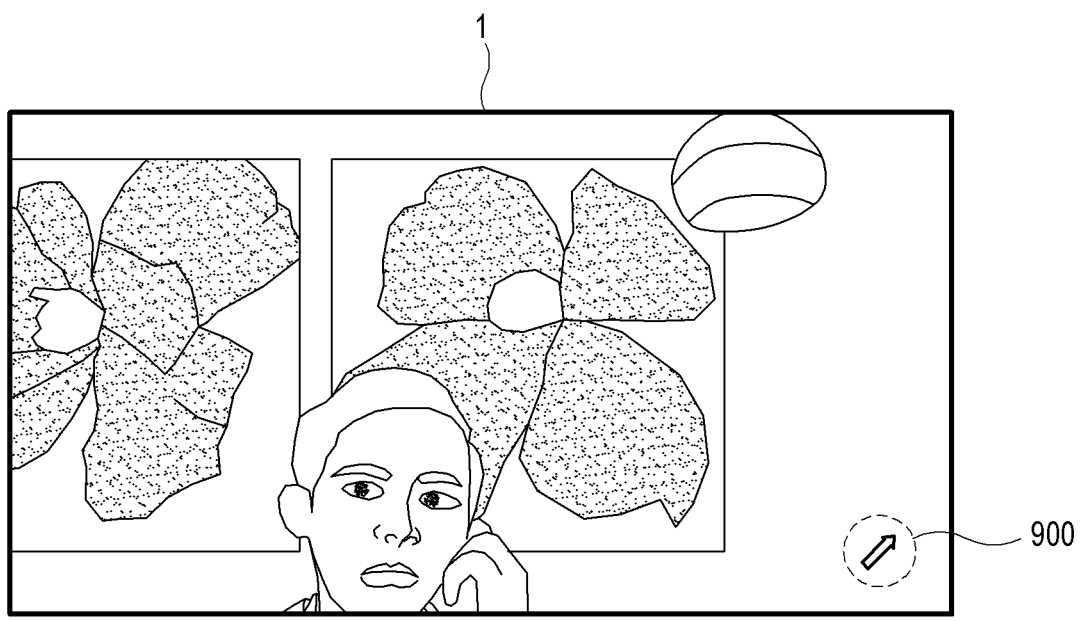
FIG. 9 illustrates an example of providing an arrow to indicate a direction where the display quality is high according to another exemplary embodiment.

FIG. 9 illustrates an example of providing an arrow 900 to indicate a direction in which the display quality is high according to another exemplary embodiment. To induce a movement of the viewpoint 101 in a direction in which the user can smoothly move the viewpoint 101, the controller 309 may display the arrow 900 on the display 303 to indicate a viewpoint in which a segment having a degree of display quality higher than other segments from among a plurality of segments 400 to 405 is located.

As another example, the arrow 900 may indicate a viewpoint in which a segment having a degree of display quality lower than that of other segment from among the plurality of segments 400 to 405 is located.

Hereinafter, various exemplary embodiments for a condition in which information about display quality is provided will be described with reference to the accompanying drawings. The information about display quality for each of the segments 400 to 405 may be provided only when a predetermined condition is satisfied. For example, the predetermined condition may be implemented in any of various circumstances, such as when the viewpoint 101 is moved, when the viewpoint 101 is fixed, when the viewpoint 101 comes close to borders between the segments 400 to 405, when the degree of display quality exceeds a predetermined critical level, when the degree of display quality is equal to or less than a predetermined critical level, when the degree of display quality is changed more than predetermined amount, etc. Hereinbelow, for the sake of convenient illustration, some exemplary embodiments from among these various exemplary embodiments will be described, but the present disclosure is not limited thereto.

Figure 10:
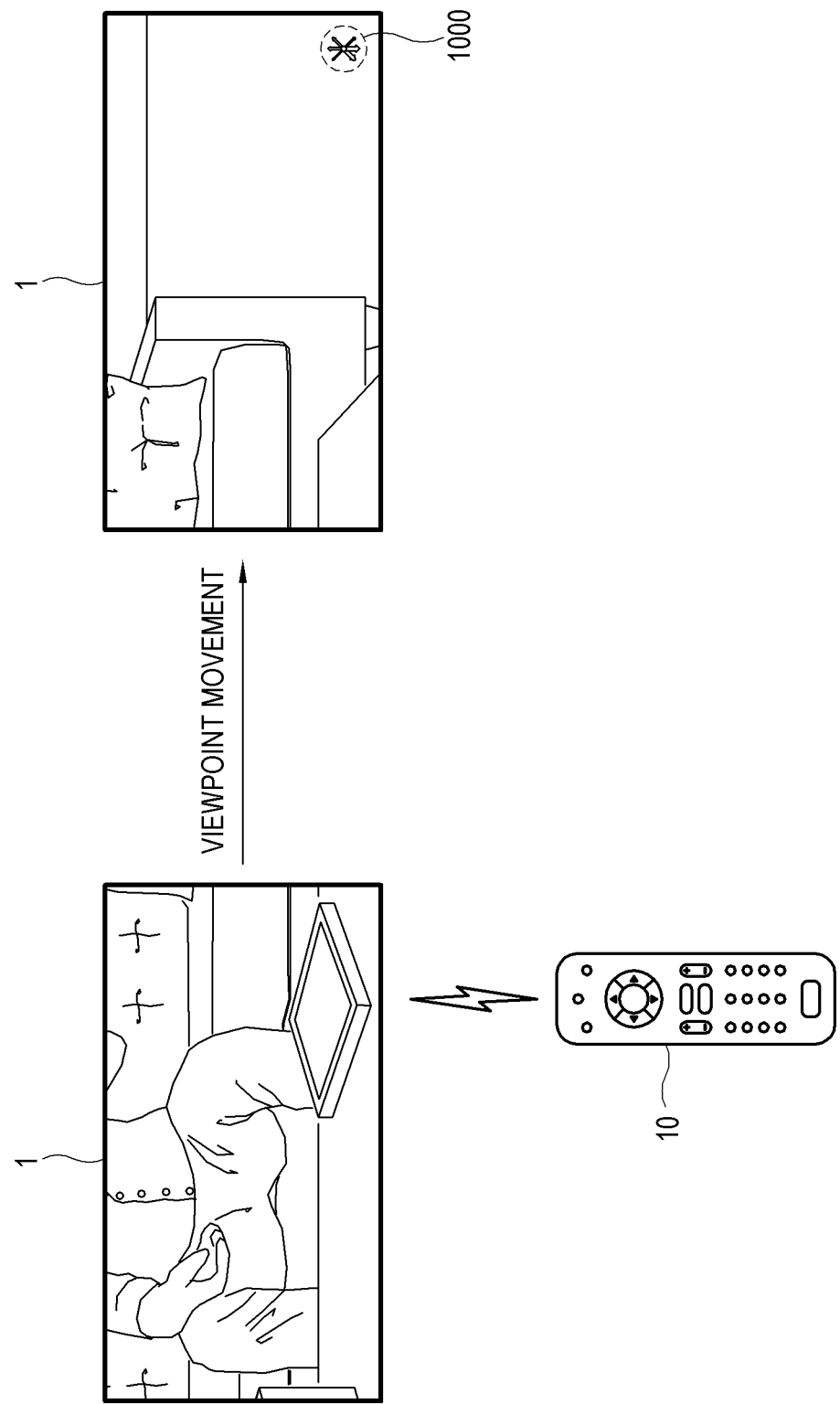
FIG. 10 illustrates an example of providing the information about display quality when a viewpoint is moved according to an exemplary embodiment.

FIG. 10 illustrates an example of providing the information about display quality when the viewpoint 101 is moved according to an exemplary embodiment. The controller 309 may not provide any information about display quality while the viewpoint 101 is stopped, and may then provide information about display quality 1000 for segments 400 to 405 in which adjacent viewpoints are located, respectively, to help smooth movement of the viewpoint 101 when the viewpoint 101 begins to move. As described above, the information about display quality 1000 may be provided in any of various ways, such as a UI including at least one item corresponding to at least one of adjacent viewpoints or segments 400 to 405 in which the adjacent viewpoints located, a text, and the like.

Figure 11:
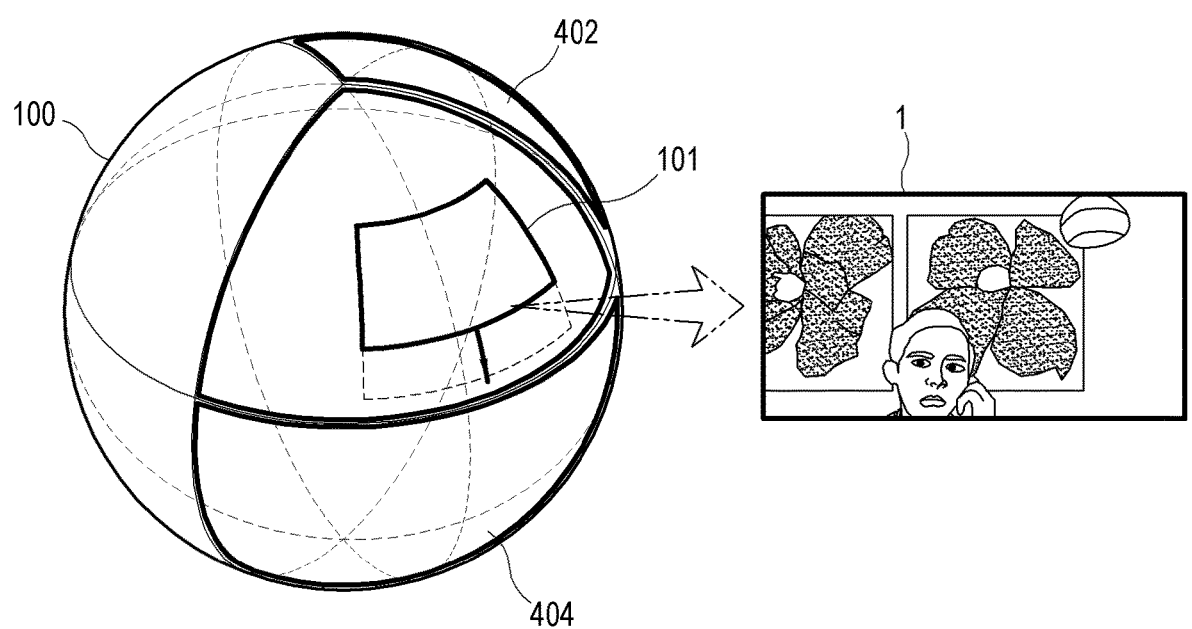
FIG. 11 illustrates an example in which the viewpoint comes close to a border between segments of the image according to an exemplary embodiment.
Figure 12:
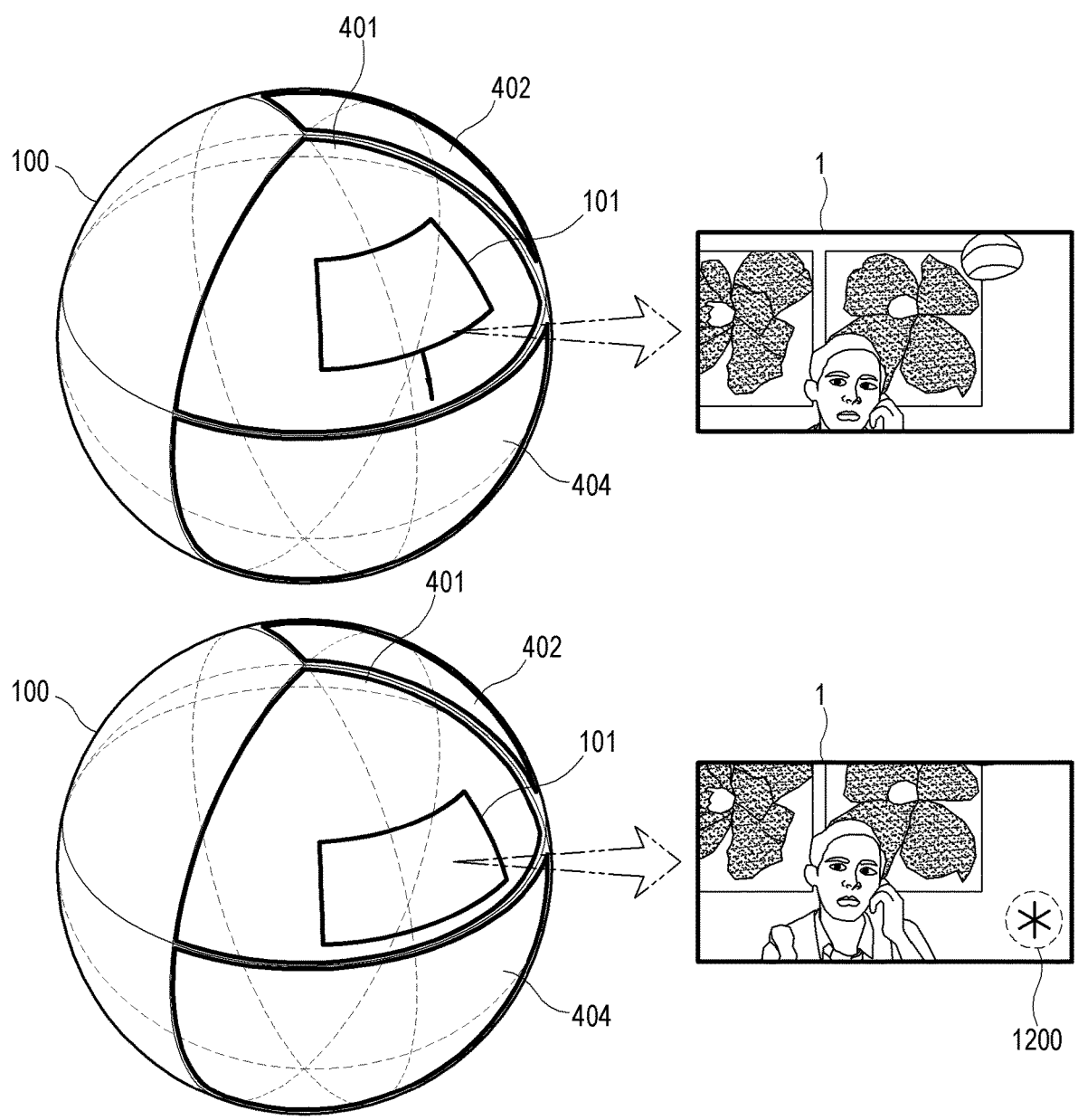
FIG. 12 illustrates an example of providing the information about display quality when the viewpoint comes close to the border between the segments of the image according to an exemplary embodiment.

FIG. 11 illustrates an example in which the viewpoint 101 comes close to a border between the segments according to an exemplary embodiment, and FIG. 12 illustrates an example of providing information about display quality when the viewpoint 101 comes close to the border between the segments according to an exemplary embodiment. The controller 309 may provide the information about display quality when the viewpoint 101 moves and comes within a predetermined distance from one of borders between the segments 400 to 405. In other words, if the viewpoint 101 moves and comes close to one of borders between the segments 400 to 405 to be located therebetween, the controller 309 determines that the viewpoint 101 can move from one segment to another segment and provides information about display quality 1200 for segments in which viewpoints adjacent to the viewpoint 101 are located.

As another example, the controller 309 may provide information about display quality only for a segment from which the viewpoint 101 comes within the predetermined distance. For an example, if the viewpoint 101 is located in a first segment 401 and then comes close to a border between the first segment 401 and a second segment 402, the controller 309 provides information about display quality for the second segment 402. Likewise, if the viewpoint 101 comes close to a border between the first segment 401 and a third segment 404, the controller 309 provides information about display quality for the third segment 404.

The drawing is merely provided by way of an example, and shapes and sizes of the segments 401, 402 and 404 are not limited to those illustrated in the drawing.

Figure 13:
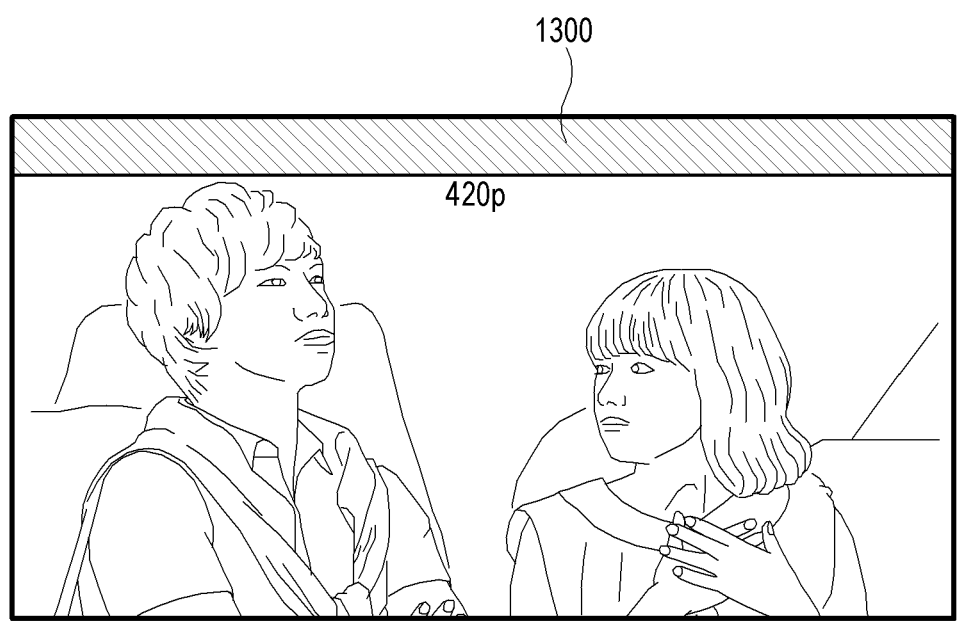
FIG. 13 illustrates an example of providing the information about display quality when a degree of display quality is less than a predetermined critical level.

FIG. 13 illustrates an example of providing information about display quality when the degree of display quality is equal to or less than a predetermined critical level. To allow the user to smoothly move the viewpoint, the controller 309 provides information about display quality 1300 for segments 400 to 405 in which the degree of display quality is equal to or less than the predetermined critical level. As another example, the controller 309 may provide information about display quality 1300 for segments 400 to 405 in which the degree of display quality is equal to or more than the predetermined critical level. Although the drawing has illustrated an example of providing the information about display quality 1300 in a shading form on an edge corresponding to a direction toward a segment or segment 400 to 405 in which the level of display quality is equal to or less than the predetermined critical level from among the image being displayed, the present disclosure is not limited thereto.

Figure 14:
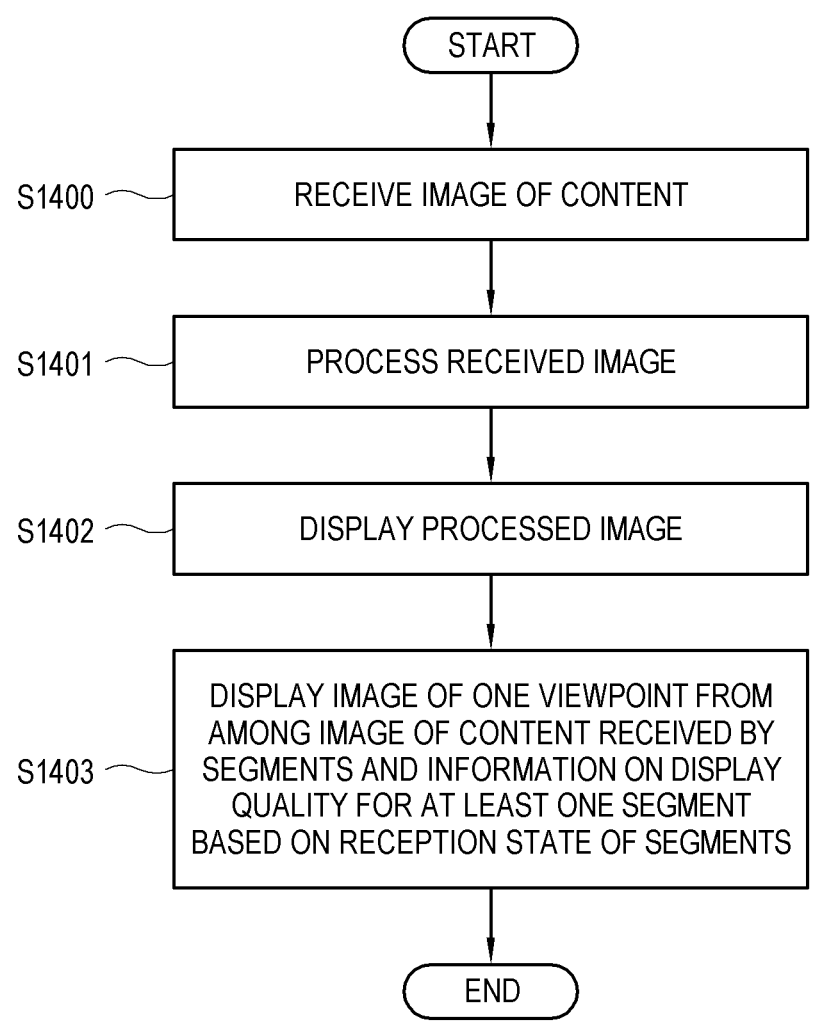
FIG. 14 is a flowchart illustrating a control process of the display apparatus according to an exemplary embodiment.

FIG. 14 is a flowchart illustrating a control process of the display apparatus according to an exemplary embodiment.

At operation S1400, the receiver receives an image of content. At operation S1401, the signal processor 301 processes the received image of content. At operation S1402, the display 303 displays the processed image of content. At operation S1403, the controller 309 displays an image corresponding to one viewpoint from among the image of content received by segments 400 to 405 and information about display quality for at least one segment based on reception states of the segments 400 to 405.

Moreover, in the control method of the display apparatus illustrated in FIG. 14, the configuration of the display apparatus 1 explained with reference to FIGS. 1 to 13 may be applied in the same or similar manner.

As described above, according to exemplary embodiments, the display apparatus may provide the information about display quality for the at least one segment of the image of content, thereby, if the image of content is a 360 degree image, allowing the user to smoothly move the viewpoint while watching the image.

While exemplary embodiments have been shown and described above, it will be understood by those skilled in the art that various changes in form and details may be made therein without departing from the present disclosure as defined by the appended claims and their equivalents.

What is claimed is:

1. A display apparatus comprising:
a receiver;
a display; and
a processor configured to:
control the receiver to receive a plurality of image segments of a content;
generate a content image mapped to a three dimensional (3D) object based on the plurality of image segments received via the receiver;
control the display to display a first area of the content image corresponding to a first viewpoint;
control the display to display, while the first area corresponding to the first viewpoint is displayed, information about a display quality of a second area of the content image corresponding to a second viewpoint adjacent to the first viewpoint, based on reception states of the plurality of image segments; and
in response to the second viewpoint being selected via a user command moving a viewpoint, control the display to display the second area corresponding to the second viewpoint.

2. The display apparatus according to claim 1, wherein the display quality comprises at least one of a speed in which an image segment corresponding to the second viewpoint is received, an extent to which the image segment corresponding to the second viewpoint has been received, a playable time of the image segment corresponding to the second viewpoint, and a resolution of the image segment corresponding to the second viewpoint.

3. The display apparatus according to claim 1, wherein the processor is configured to control the display to display the information about the display quality as text.

4. The display apparatus according to claim 1, wherein the processor is configured to control the display to display a user interface (UI) including at least one graphic having a size corresponding to a degree of the display quality.

5. The display apparatus according to claim 1, wherein the processor is configured to control the display to display a first color in response to the display quality being a first level, and to display a second color, different from the first color, in response to the display quality being a second level higher than the first level.

6. The display apparatus according to claim 5, wherein the processor is configured to control the display to display a third color, having a shade between a shade of the first color and a shade of the second color, in response to the display quality being a third level between the first level and the second level.

7. The display apparatus according to claim 1, wherein the processor is configured to control the display to display an arrow indicating a direction of at least one image segment having a degree of the display quality higher or lower than a degree of display quality of other image segments from among the plurality of image segments.

8. The display apparatus according to claim 1, wherein the processor is configured to control the display to display the information about the display quality on an edge of the display corresponding to a direction of the second viewpoint.

9. The display apparatus according to claim 1, wherein the processor is configured to control the display to display the information about the display quality on the display in response to the first viewpoint being moved after having been stopped.

10. The display apparatus according to claim 1, wherein the processor is configured to control the display to display the information about the display quality on the display in response to the first viewpoint being moved within a predetermined distance from a border between the first viewpoint and the second viewpoint.

11. The display apparatus according to claim 1, wherein the processor is configured to control the display to display the information about the display quality in response to a degree of display quality being lower than a predetermined critical level.

12. The display apparatus according to claim 1, wherein the processor is configured to control the display to display the information about the display quality in response to the display quality being changed more than a predetermined amount.

13. A control method of a display apparatus comprising:
receiving a plurality of image segments of a content;
processing the received plurality of image segments; and
displaying the processed plurality of image segments,
wherein the displaying comprises:
generating a content image mapped to a three dimensional (3D) object based on the received plurality of image segments;
displaying a first area of the generated content image corresponding to a first viewpoint;
displaying, while the first area corresponding to the first viewpoint is displayed, information about a display quality of a second area of the content image corresponding to a second viewpoint adjacent to the first viewpoint, based on reception states of the plurality of image segments; and
in response to the second viewpoint being selected via a user command moving a viewpoint, displaying the second area corresponding to the second viewpoint.

14. The method according to claim 13, wherein the display quality comprises at least one of a speed in which an image segment corresponding to the second viewpoint is received, an extent to which the image segment corresponding to the second viewpoint has been received, a playable time of the image segment corresponding to the second viewpoint, and a resolution of the image segment corresponding to the second viewpoint.

15. The method according to claim 13, wherein the displaying the information about the display quality comprises displaying a degree of display quality as text.

16. The method according to claim 13, wherein the displaying the information about the display quality comprises displaying on a display, a user interface (UI) including at least one graphic having a size corresponding to a degree of the display quality.

17. The method according to claim 13, wherein the displaying the information about the display quality comprises displaying a first color in response to the display quality being a first level, and displaying a second color, different from the first color, in response to the display quality being a second level higher than the first level.

18. The method according to claim 17, wherein the displaying the information about the display quality comprises displaying a third color having a shade between a shade of the first color and a shade of the second color in response to the display quality being a third level between the first level and the second level.

19. The method according to claim 13, wherein the displaying the information about the display quality comprises displaying an arrow indicating a direction of at least one image segment having a degree of display quality higher or lower than a degree of display quality of other image segments from among the plurality of image segments.

20. The method according to claim 13, wherein the displaying the information about the display quality comprises displaying the information about the display quality on an edge of a display corresponding to a direction of the second viewpoint.

21. The display apparatus according to claim 1, wherein the second viewpoint includes a plurality of adjacent viewpoints, and
wherein the processor is further configured to control the display to display, while the first area corresponding to the first viewpoint is displayed, information about each adjacent viewpoint from among the plurality of adjacent viewpoints.

22. The display apparatus according to claim 21, wherein each adjacent viewpoint from among the plurality of adjacent viewpoints corresponds to a respective image segment from among the plurality of image segments, and
wherein each adjacent viewpoint from among the plurality of adjacent viewpoints does not overlap with the first viewpoint.

23. The display apparatus according to claim 21, wherein the processor is further configured to receive the user command moving the viewpoint and to change the viewpoint to which a displayed image corresponds based on the received user command moving the viewpoint.

24. The display apparatus according to claim 1, wherein the processor is further configured to control the display to display images corresponding to a plurality of viewpoints such that only one viewpoint from among the plurality of viewpoints is displayed at a time, and
wherein the plurality of viewpoints includes the first viewpoint and the second viewpoint.

25. The display apparatus according to claim 1, wherein the second area corresponding to the second viewpoint comprises one of a plurality of second areas of the content image corresponding to a plurality of second viewpoints adjacent to the first area corresponding to the first viewpoint, in directions different from each other, and
wherein the processor is further configured to control the display to display, while the first area corresponding to the first viewpoint is displayed, information about the display quality of the plurality of second areas.

26. The method according to claim 13, wherein the second area corresponding to the second viewpoint comprises one of a plurality of second areas of the content image corresponding to a plurality of second viewpoints adjacent to the first area corresponding to the first viewpoint, in directions different from each other, and
wherein the displaying the information about the display quality comprises displaying, while the first area corresponding to the first viewpoint is displayed, information about the display quality of the plurality of second areas.

\* \* \* \* \*